April 24, 1951  R. G. SPIESS, JR., ET AL  2,550,170
VEHICLE SEAT CONSTRUCTION
Filed Aug. 13, 1945  2 Sheets-Sheet 1
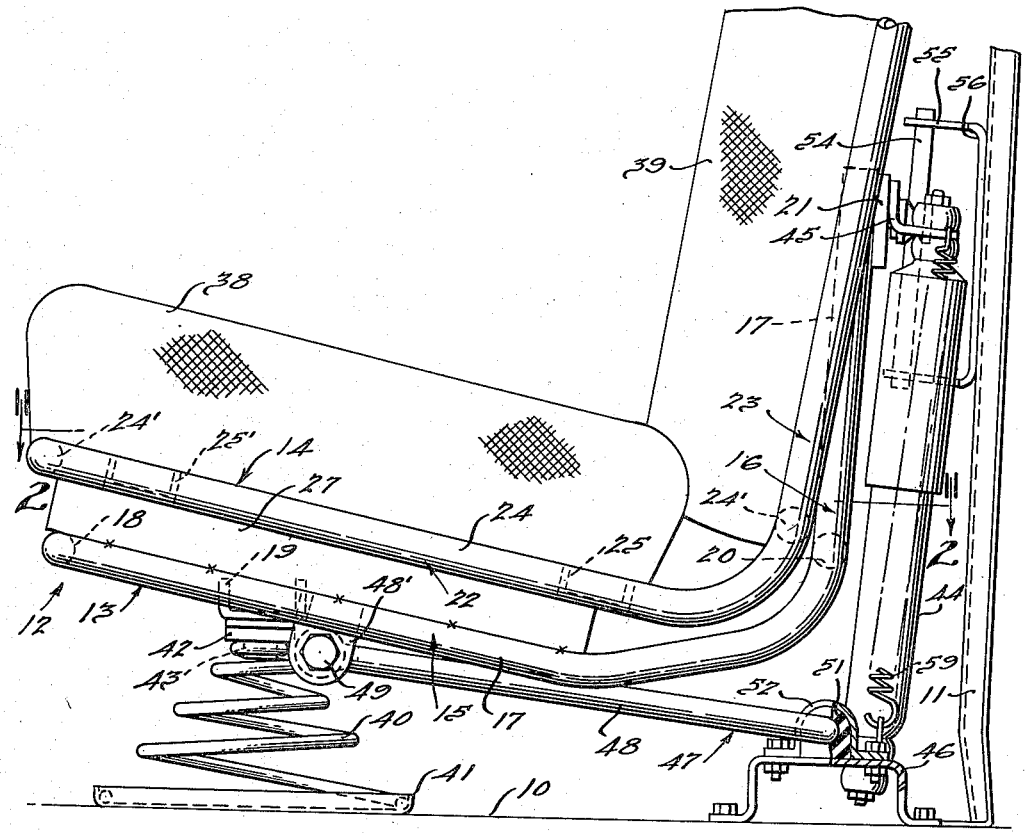
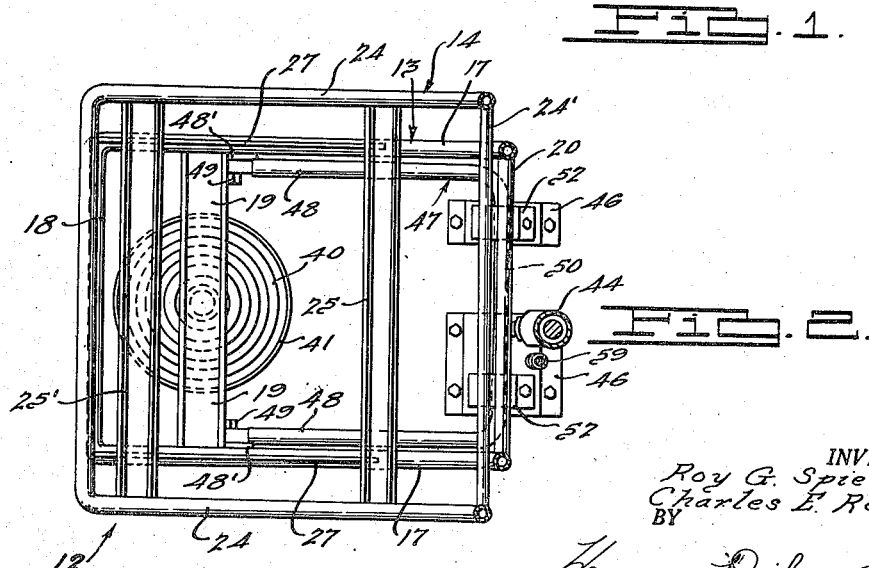
INVENTORS.
Roy G. Spiess, Jr.
Charles E. Read.
BY
Barnes, Dickey & Pierce
ATTORNEYS.

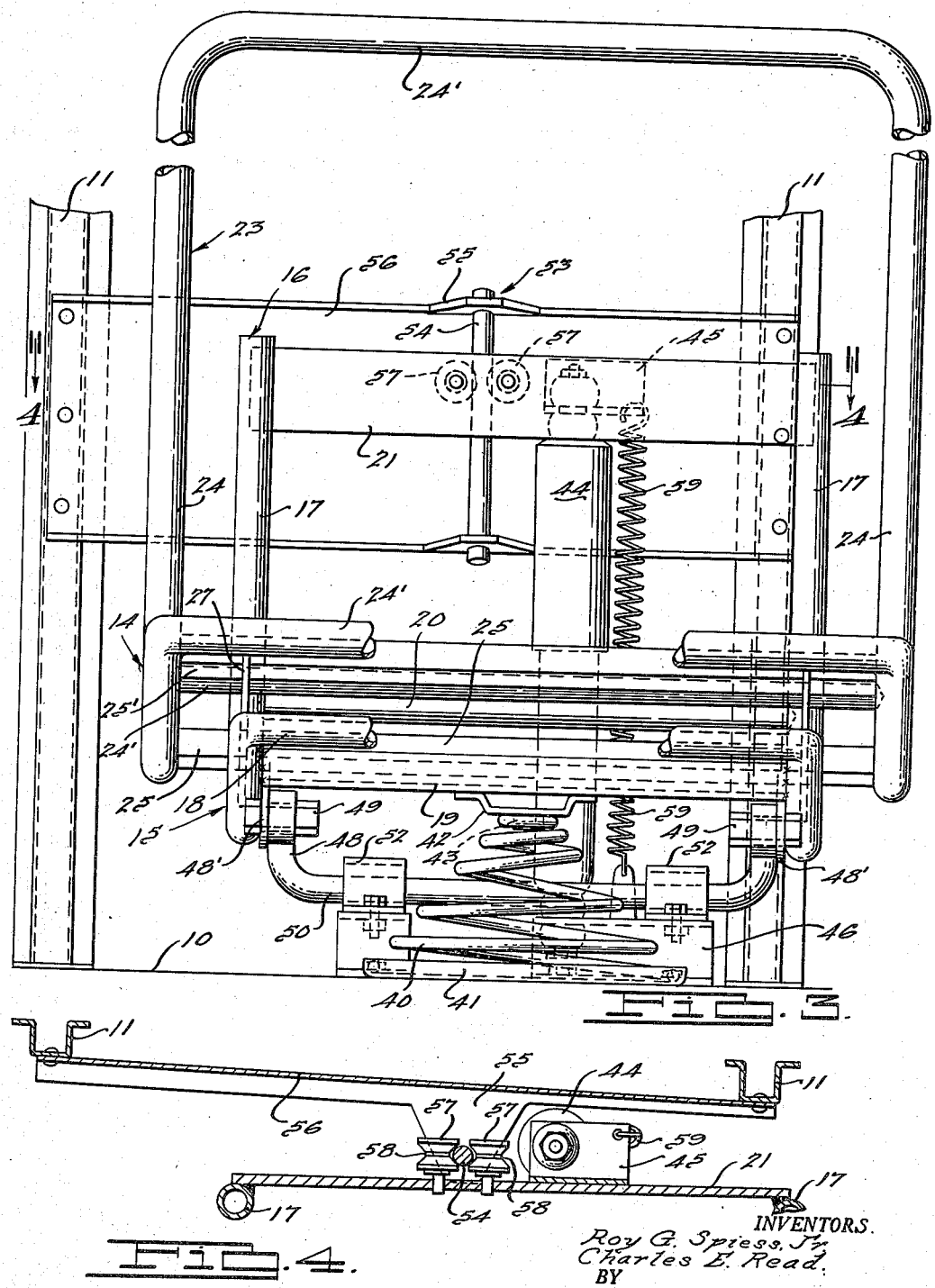

Patented Apr. 24, 1951

2,550,170

UNITED STATES PATENT OFFICE 2,550,170

VEHICLE SEAT CONSTRUCTION

Roy G. Spiess, Jr., Owosso, and Charles E. Read, Monroe, Mich., assignors to Monroe Auto Equipment Company, Monroe, Mich., a corporation of Michigan Application August 13, 1945, Serial No. 610,470

6 Claims. (Cl. 155—9)

This invention relates generally to vehicle seats and refers more particularly to improvements in mountings for vehicle seats.

In many types of vehicles, it is not feasible to design the body spring arrangement to afford the optimum riding characteristics for the passengers or occupants of the vehicle. There are numerous other factors that must be taken into consideration when designing the body springing arrangement such, for example, as the weight of the sprung assembly and the load the latter is adapted to carry. Thus, in most heavy vehicles such as trucks, tractors and the like, riding comfort is sacrificed for load carrying requirements with the result that the occupants of the seat become fatigued in a relatively short space of time.

The present invention contemplates overcoming the above objections by providing a seat mounting which affords the optimum riding qualities regardless of the type of body springing arrangement required to provide satisfactory operation under maximum load carrying conditions. In accordance with this invention, the seat is supported on the sprung assembly of the vehicle by springs which absorb shocks transmitted to the sprung assembly by the unsprung unit of the vehicle and the action of the springs is controlled by a double acting hydraulic shock absorber. Also the present invention provides means for stabilizing movement of the seat and for maintaining the seat on a substantially even keel regardless of the distribution of load on the seat.

Still another object of this invention is to provide means for guiding movement of the seat in a substantially straight line path of travel. As a result, tipping and forward pitching of the seat is avoided.

A still further object of this invention is to provide a seat construction of the above general type composed of a relatively few simple parts capable of being inexpensively manufactured, assembled and installed.

The foregoing as well as other objects of this invention will be made apparent as this description proceeds, especially when considered in connection with the accompanying drawings, wherein:

Figure 1 is a side elevational view, with parts broken away in section, of a seat construction embodying the features of this invention;

Figure 2 is a reduced sectional view of the structure illustrated in Figure 1, taken along the line 2—2 thereof;

Figure 3 is a fragmentary front elevational view of the seat construction;

Figure 4 is a sectional view of the structure illustrated in Figure 3, taken along the line 4—4 thereof;

Referring now more in detail to the drawings, it will be noted that the reference character 10 indicates the floor section of a motor vehicle body and the numeral 11 designates a pair of frame members which extend upwardly from the floor section 10 in spaced relation to each other transversely of the body and having the lower ends fixed to the floor section 10. The numeral 12 indicates a seat construction comprising a supporting frame 13 and a seat frame 14.

The supporting frame 13 comprises a substantially horizontal portion 15 and a vertical upwardly extending portion 16 at the rear of the portion 15. In accordance with conventional practice, tubular members 17 are disposed at opposite sides of the portion 15 of the frame 13 and the rear ends of the tubes are bent upwardly to assume positions at opposite sides of the portion 16 of the frame 13. The front ends of the tubular members 17 are connected together by means of a tubular portion 18, and an upwardly opening substantially channel-shaped brace 19 extends between the tube sections 17 at a point spaced rearwardly from the tube section 18. The opposite ends of the brace 19 are welded or otherwise permanently secured to the tube sections 17 to form a unitary construction. The upwardly extending portions of the tubes 17 are connected together by means of a tubular member 20 and a cross-bar 21 having the opposite ends rigidly secured to the portions to form an integral construction.

The seat frame 14 comprises a substantially horizontally disposed portion 22 and a vertically extending portion 23 extending upwardly from the rear side of the portion 22. Tubing 24 extends along opposite sides of the above portions and the tubing on one side is rigidly connected to the tubing at the opposite side by means of a plurality of spaced tubular members or integral portions 24' and by braces 25 and 25' which are substantially channel-shaped in cross-section and have the opposite ends welded or otherwise permanently secured to the tube sections to form an integral structure.

The substantially horizontally disposed portion 22 of the seat frame 14 is positioned above the corresponding portion 15 of the supporting frame 13 and may be mounted on the latter for sliding movement fore and aft of the vehicle but is illustrated as being rigidly connected to the supporting frame 13 by any suitable means such as plate members 27.

It will be noted from Figure 1 of the drawings that the portion 22 of the seat frame 14 is adapted to support a seat cushion 38 and the vertical portion 23 is adapted to support a back cushion 39. These cushions may be supported on their respective portions of the seat frame by any suitable means not shown herein.

The frame 13 is supported in an elevated position with respect to the vehicle body flooring 10 by means of a coil spring 40 centrally located with respect to the horizontal portion 15 of the frame 13. The coil spring 40 is preferably of the variable rate type characterized in that succeeding convolutions are adapted to nest one within the other upon deflection of the spring. This construction is preferred because it enables supporting the seat in relatively close proximity to the vehicle body flooring 10 and at the same time assures ample clearance for the required vertical travel of the seat construction.

Upon reference to Figures 1 and 3 of the drawings, it will be noted that the lowermost convolution of the coil spring 40 is supported in a retainer 41 which, in turn, is secured to the vehicle body flooring 10 and the uppermost convolution engages an abutment 42. The abutment 42 is fixed to the cross-brace 19 intermediate the ends of the latter and is provided with a depending projection 43. The projection 43 extends into the top convolution of the coil spring and prevents lateral shifting movement of the spring relative to the frame 13. It follows from the above that the spring 40 supports the seat construction in an elevated position with respect to the vehicle body flooring 10 and serves to cushion shocks transmitted to the seat construction.

The action of the coil spring 40 is controlled by a single shock absorber 44 positioned at the rear side of the portion 16 of the supporting frame 13. The shock absorber 44 is of the tubular direct acting type and is supported with its axis extending substantially vertically. The upper end of the shock absorber is connected to the cross brace 21 by means of a bracket 45 and the lower end of the shock absorber is connected to the vehicle body flooring 10 by means of a bracket 46. The shock absorber is of the hydraulic type, such as illustrated and described in Becker Patent No. 2,078,364, issued November 12, 1935, and acts to dampen the recoil action of the coil spring 40.

In order to stabilize the seat construction and, at the same time maintain the seat on a substantially even keel regardless of the distribution of the load on the seat frame 14, a stabilizer 47 is provided. The stabilizer 47 comprises generally a U-shaped bar supported in a substantially horizontal plane beneath the supporting frame 13. As shown in Figure 3 of the drawings, the free ends of the leg portions 48 of the bar are respectively pivotally connected to plates 48', on opposite sides of the supporting frame 13 by means of studs 49 and the interconnecting portion 50 of the bar is journalled at longitudinally spaced points in rubber blocks 51. The blocks 51 are respectively supported in retainers 52, which in turn, are connected to the vehicle body flooring 10. Thus it will be noted that the bar resists angular or tipping movement of one side of the seat construction relative to the opposite side and tends to maintain the seat on a substantially even keel even though the load on the seat is not evenly distributed.

It is also desired to guide the seat in a substantially straight line path of travel, and for this purpose a guide 53 is provided. The guide 53 comprises a vertically extending rod 54 having the opposite ends anchored in the leg portions 55 of a channel shaped cross-brace 56 which has the opposite ends secured to the vertical frame members 11. Thus, the bar 54 is held against movement with the seat by the frame members 11. A pair of rollers 57 are supported for rotation on the cross-brace 21 at opposite sides of the bar 54. As shown in Figure 4 of the drawings, the rollers are formed with V-shaped grooves 58 which receive opposite sides of the rod 54 and frictionally engage the latter. Thus, the rollers not only cooperate with the rod to guide vertical movement of the seat in a substantially straight line path of travel, but also serves to prevent pitching movement of the seat in either direction from its normal position.

In addition to the foregoing, it will be noted that upward displacement of the seat assembly is resisted by a hold-down spring 59 positioned adjacent the shock absorber 44. The upper end of the hold-down spring engages the bracket 45 on the cross-brace 21 and the lower end of the hold-down spring is connected to the bracket 46 on the vehicle body flooring 10.

What we claim as our invention is:

1. A seat construction for a vehicle having a fixed member and an upstanding part, said seat construction including a frame assembly comprising a seat part and an upstanding back part, a spring seat connected to the underside of said seat part, a conical coil spring having its upper end engaging said spring seat and its lower end adapted to engage the vehicle fixed member for supporting said frame assembly for vertical movement and being constructed so that the coils thereof are capable of nesting within each other upon compression of the spring so as to permit the seat portion to be supported in relatively close proximity to the vehicle fixed member, a tubular direct acting shock absorber having one end connected to said frame assembly and the other end adapted to be connected to said vehicle fixed member for dampening the rebound motion of said spring, means confining movement of the frame assembly to a substantially straight-line path of travel including a substantially vertical guide adapted to be carried by one of said upstanding parts and rollers carried by the other of said upstanding parts for engagement with the opposite sides of said guide, means coacting with the last-named means to stabilize the action of the frame assembly and maintain the same on a substantially even keel including a bar extending lengthwise of and in a plane below the frame assembly and adapted to be journaled on said vehicle fixed member, and arms rigidly connected to and extending from opposite ends of said bar below said frame assembly and having their free ends pivotally connected to said frame assembly, said arms being of a substantially greater length than the length of the vertical path of movement of the free ends thereof during the vertical movement of said frame assembly so that said free ends will travel along a substantially straight-line path and thereby co-act and cooperate with said rollers and vertical guide to provide a seat frame assembly which is positively guided along said straight-line path of travel without any danger of binding between said rollers and vertical guide.

2. A seat construction for a vehicle having a fixed member and an upstanding part, said seat construction including a frame assembly comprising a seat part and an upstanding back part, a spring seat connected to the underside of said seat part, a conical coil spring having its upper end engaging said spring seat and its lower end adapted to engage the vehicle fixed member for supporting said seat frame assembly for vertical movement and being constructed so that the coils thereof are capable of nesting within each other upon compression of the spring so as to permit the seat part to be supported in relatively close proximity to the vehicle fixed member, a tubular direct acting shock absorber having one end connected to said frame assembly and the other end adapted to be connected to said vehicle fixed member for dampening the rebound motion of said spring, means confining movement of the frame assembly to a substantially straight-line path of travel including a substantially vertical guide adapted to be carried by one of said upstanding parts and rollers carried by the other of said upstanding parts for engagement with the opposite sides of said guide, and stabilizing means for resisting sidewise tipping of the frame assembly including a torsion bar extending lengthwise of said seat frame assembly and adapted to be journaled on said vehicle fixed member, and arms rigidly connected to and extending from opposite ends of said bar, having their free ends pivotally connected to said frame assembly, said arms being of a substantially greater length than the length of the vertical path of movement of the free ends thereof during the vertical movement of said frame assembly.

3. A vehicle seat construction including in combination a fixed member having an upstanding part, a frame assembly having an upstanding part, spring means supporting the frame assembly on said fixed member and permitting vertical movement of the frame assembly relative to said fixed member, means confining movement of the frame assembly to a substantially straight-line path of travel and including a vertical guide carried by one of said upstanding parts and rollers carried by the other of said upstanding parts, in engagement with opposite sides of the guide, a bar extending lengthwise of said frame assembly and journaled on said fixed member, and arms rigidly connected with and extending angularly from opposite ends of said bar and having the free ends thereof journaled on said frame assembly, said arms having a substantial length relative to the vertical movement of the seat.

4. A seat construction for a vehicle having a supporting member, comprising a frame member, spring means for supporting the frame member on the supporting member of the vehicle permitting vertical movement of the frame member relative to the vehicle supporting member, means for confining vertical movement of the frame member to a substantially straight-line path of travel including a rectilinear guide element carried on one member and cooperating anti-friction means carried on the other member, a bar extending lengthwise of said frame member and journaled on one of said members, and arms rigidly connected to said bar and extending angularly therefrom and having their free ends journaled on the other member, said arms having a substantial length relative to the vertical movement of the seat.

5. A seat construction for a vehicle having a fixed member and an upstanding part, said seat construction including a frame assembly comprising a seat part and an upstanding back part, spring means supporting the frame assembly on said fixed member and permitting vertical movement of the frame assembly relative to said fixed member, means confining movement of the frame assembly to a substantially straight-line path of travel including a substantially vertical guide carried by one of said upstanding parts and rollers carried by the other of said upstanding parts for engagement with the opposite sides of said guide, and stabilizing means for resisting sidewise tilting of the frame assembly including a torsion bar extending lengthwise of said seat frame assembly and adapted to be journaled on said vehicle fixed member, and arms rigidly connected to and extending from opposite ends of said bar, having their free ends pivotally connected to said frame assembly, said arms being of a substantially greater length than the length of the vertical path of movement of the free ends thereof during the vertical movement of said frame assembly.

6. A seat construction for a vehicle having a fixed member and an upstanding part, said seat construction including a frame assembly comprising a seat part and an upstanding back part, spring means supporting the frame assembly on said fixed member and permitting vertical movement of the frame assembly relative to said fixed member, a tubular direct acting shock absorber having one end connected to said frame assembly and the other end adapted to be connected to said vehicle fixed member for dampening the rebound motion of said spring, means confining movement of the frame assembly to a substantially straight-line path of travel including a substantially vertical guide carried by one of said upstanding parts and rollers carried by the other of said upstanding parts in engagement with the opposite sides of said guide, means coacting with the last-named means to stabilize the action of the frame assembly and maintain the same on a substantially even keel including a bar extending lengthwise of the frame assembly and adapted to be journaled on said vehicle fixed member, and arms rigidly connected to and extending from opposite ends of said bar and having their free ends pivotally connected to said frame assembly, said arms being of a substantially greater length than the length of the vertical path of movement of the free ends thereof during the vertical movement of said frame assembly so that said free ends will travel along a substantially straight-line path and thereby coact and cooperate with said rollers and vertical guide to provide a seat frame assembly which is positively guided along said substantially straight-line path of travel.

ROY G. SPIESS, JR.
CHARLES E. READ.

REFERENCES CITED

The following references are of record in the file of this patent:

UNITED STATES PATENTS

| Number | Name | Date |
|---|---|---|
| 135,557 | Huffman | Feb. 4, 1873 |
| 1,151,910 | Sturgess | Aug. 31, 1915 |
| 1,423,460 | Schreiber | July 18, 1922 |
| 1,767,757 | Harris | June 24, 1930 |
| 1,770,321 | Mougeotti | July 8, 1930 |
| 1,929,023 | Hickman | Oct. 3, 1933 |
| 2,267,668 | Randolph | Dec. 23, 1941 |
| 2,334,922 | Gustafson | Nov. 23, 1943 |
| 2,357,825 | Hickman et al. | Sept. 12, 1944 |
| 2,366,730 | Hickman | Jan. 9, 1945 |